United States Patent [19]

Johnson, Jr.

[11] Patent Number: 4,574,631
[45] Date of Patent: Mar. 11, 1986

[54] LIQUID LEVEL MOLDED INDICATING GAGE PORTIONS

[76] Inventor: Stanley A. Johnson, Jr., 2575 Maple Hill Dr., Brookfield, Wis. 53005

[21] Appl. No.: 764,776

[22] Filed: Aug. 12, 1985

[51] Int. Cl.[4] ..................... G01F 23/32; G01D 11/26
[52] U.S. Cl. ....................................... 73/317; 73/431; 425/169
[58] Field of Search ................. 73/317, 318, 431, 307, 73/308

[56] References Cited

U.S. PATENT DOCUMENTS

| | | | |
|---|---|---|---|
| 1,072,819 | 9/1913 | Bush | 116/229 X |
| 1,463,342 | 7/1923 | Stanley | 73/317 X |
| 1,701,967 | 2/1929 | Bartels | 73/317 X |
| 2,446,844 | 3/1946 | Molaver | 73/317 |
| 2,718,785 | 9/1955 | Spencer, Sr. | 73/317 |
| 2,744,411 | 5/1955 | Spencer, Sr. | 73/317 |
| 2,920,601 | 6/1960 | Turner | 73/317 |
| 3,996,881 | 12/1976 | Schneider | 73/431 X |
| 4,254,933 | 3/1981 | Netto | 425/169 X |
| 4,445,789 | 5/1984 | Peart et al. | 73/431 X |

FOREIGN PATENT DOCUMENTS 0489026  1/1954  Italy ..................................... 73/317

Primary Examiner—Daniel M. Yasich
Attorney, Agent, or Firm—Robert T. Johnson

[57] ABSTRACT

A liquid level indicating gage comprised of two unitary or integral molded components one, or first component, molded of a clear transparent plastic being a sight window, an arc segment and two leg mounts attached to said sight window, and a mounting hole in each leg mount, and screw mounting holes in the face of the sight window, the other or second component being a unitary or integral molding of foamed plastic, this component consisting of a float section attached to a float arm section and an upper arm section and an indicating segment extending from the upper arm section, and pivot pin axle at the juncture of the upper arm section and float arm section, the second component pivot pin axle mounted in the holes in leg mounts of sight glass, the foamed plastic float section of second component having a specific gravity less than the specific gravity of liquid being measured and the float section to activate the indicating segment located on under side of the sight window.

11 Claims, 6 Drawing Figures

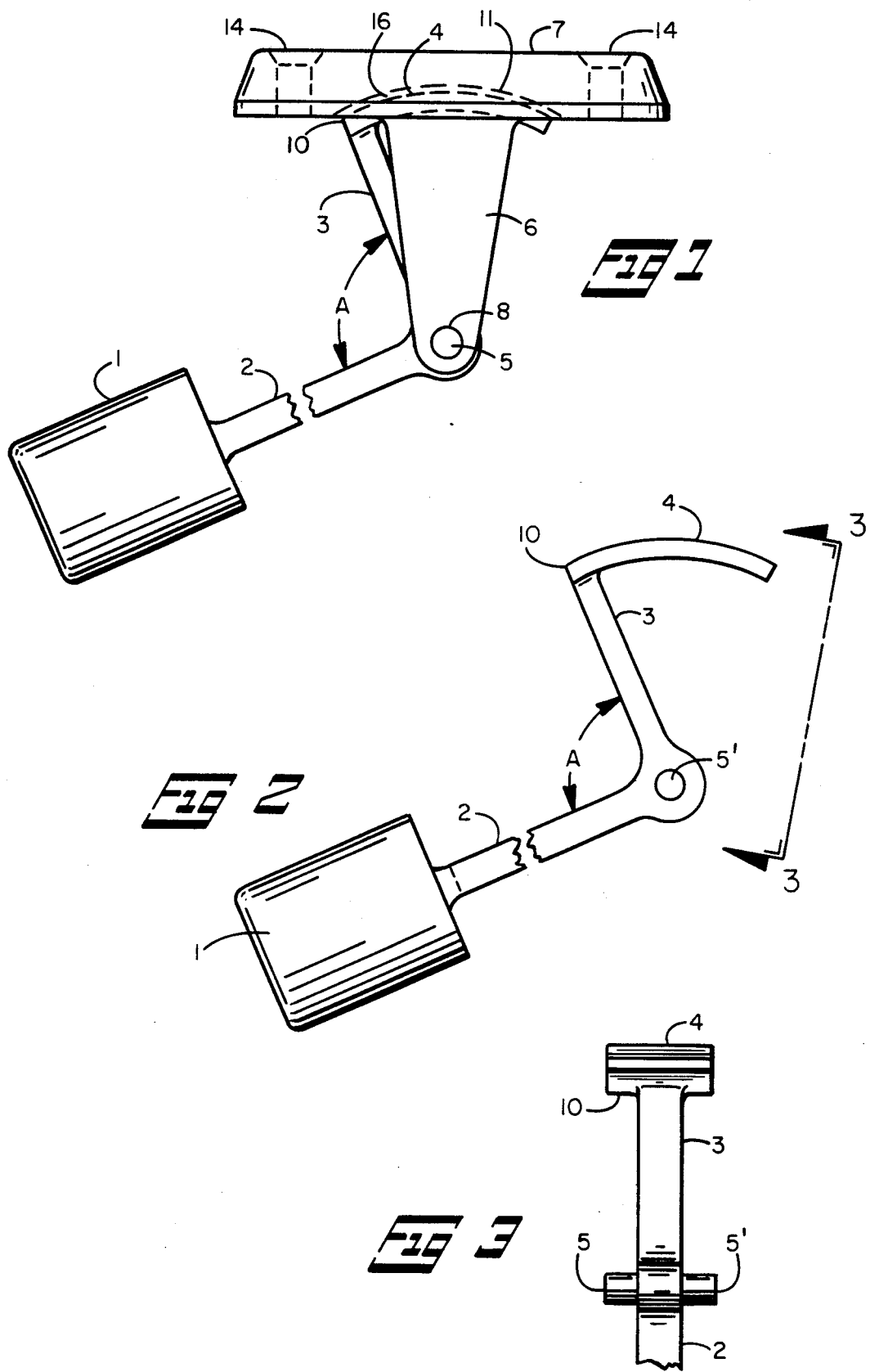

LIQUID LEVEL MOLDED INDICATING GAGE PORTIONS

BACKGROUND OF THE INVENTION

This invention is to disclose means of indicating liquid level in a tank, such fuel tanks in power mowers, snow blowers, etc.

This invention discloses a unitary molding comprising a float on a long pivot arm, an upper pivot arm attached to said long pivot arm, an indicating segment extending from said upper pivot arm, and said indicating segment shape being an arc of a radius having as its center point a pivot pin axle on which said fixed pivot arms are mounted, and said indicating segment is visible through sight window mounted on tank top surface, said pivot pin axle mounted in holes in leg mounts attached to sight window.

REFERENCE TO RELATED ART

U.S. Pat. No. 1,701,967 to Bartels for Float. This is for a float operated pointer on a tank side, actuated by a float.

U.S. Pat. No. 2,718,785 to Spencer Sr. for Liquid Level Float. This covers a liquid level indicating means in combination with a cap—the cap on the upper side of the tank.

U.S. Pat. No. 2,446,844 to Molaver for Liquid Gauge. This covers a vertical indicator actuated by a float.

U.S. Pat. No. 2,744,411 to Spencer Sr. for Liquid Level Gauge. This covers a liquid level gauge having a float and arm assembly fastened to a rotatable washer and the plug body is threaded into the tank, the indicating dial faces horizontally.

U.S. Pat. No. 2,920,601 to Turner for Filler and Liquid Level Indicator for Tanks. This comprises a cap assembly mounted to cover the filling opening, and liquid level indicating device depending therefrom.

None of the above references touch the disclosure of this present invention.

SUMMARY OF THE INVENTION

This invention discloses a liquid level indicating gage, particularly of great utility in indicating, for example, the amount of gasoline in a tank of an internal combustion engine, as used on lawn mowers, snow blowers, tillers and such.

An object of this invention is to disclose a liquid level indicating gage having a minimum number of components.

Another object of this invention is to disclose a liquid level indicating gage comprised of two fixed arms, one arm of which has a float section extending therefrom and the other arm, called an upper arm, has an indicating segment extending therefrom, said indicating segment being an arc shape having as a radius center point the pivot pin axle on which the fixed pivot arms are mounted.

Another object of this invention is to disclose a liquid level indicating gage wherein the indicating segment is movable as actuated by a float section under a sight window cover of the gage.

Another object of this invention is to disclose a liquid level indicating gage wherein the improvement comprises two fixed arms consisting of an upper arm section and a float arm section, said float arm consisting of an arm section and a float section extending therefrom, said float extending from the end of said float arm section, an upper arm segment having an indicating segment extending therefrom, said arms mounted at an angle of 90° from each other and a sight window having an arc therein, leg mounts attached to said sight window, said indicating segment being an arc segment, said arc segment concentric to arc of sight window and a clearance between said concentric arcs, and fixed arms pivot pin axle mounted in holes of said leg mounts of sight window, said sight window located on tank top and the float, float arm section, short arm section and indicating segment is immersed in the tank, below said sight window.

Another object of this invention is to disclose a liquid level indicating gage wherein a sight window is mounted on tank top surface and said sight window has calibration of F, ½ and E is on sight window.

Another object of this invention is to disclose a liquid level indicating gage wherein a float arm section length is three to ten times longer than the length of upper arm section.

An object of this invention is to disclose a liquid level gage wherein the improvement comprises an integral unitary molding of sight window and an arc segment molded therein, two leg mounts attached to said sight window and mounting holes in said leg mounts, said integral, unitary, molding of clear plastic.

Another object of this invention is to disclose a liquid level gage wherein the improvement consists of a clear plastic integral, unitary molding of sight window and an arc segment molded therein and two leg mounts attached to said sight window.

A further object of this invention is to disclose a liquid level indicating gage wherein the improvement consists of an integral molding of upper arm section, float arm section consisting of an arm section and a float section at the end of said float arm section, and an indicating segment extending from end of upper arm section.

Another object of this invention is to disclose a liquid level indicating gage wherein the improvement consists of an integral, unitary molding of upper arm section, float arm section consisting of an arm section and a float section at the end of said float arm section, and an indicating segment extending from end of upper arm section.

DESCRIPTION OF DRAWINGS

FIG. 1, is a side elevation view of the components of the liquid level indicating gage of this invention where:

Figure 4:
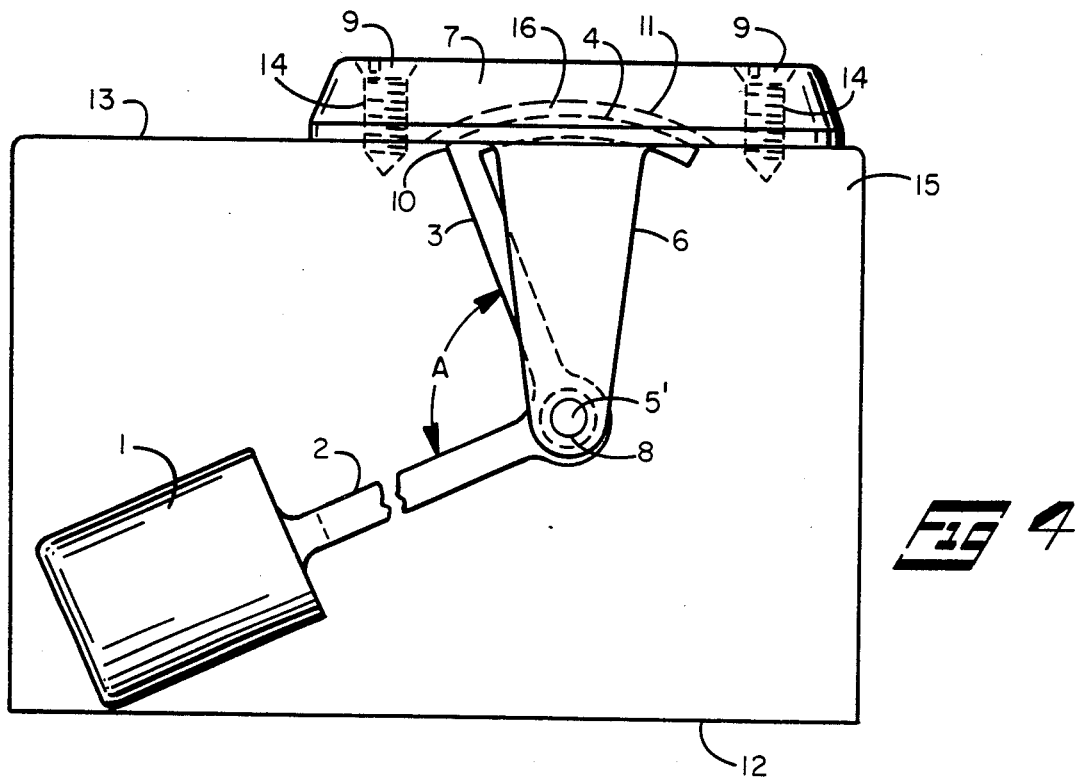

A. Angle between float arm section and upper arm section.
1. float section
2. float arm section
3. upper arm section
4. indicating segment
5. pivot pin axle
6. leg mount
7. sight window
8. hole for pivot pin axle mount
10. edge of indicating segment
11. arc of sight window
14. screw mount holes
16. clearance between arcs of 11 and indicating segment 4

FIG. 2 is an expanded side elevation view of the fixed arms and indicating segment where:

A. Angle between float arm section and upper arm section.
 1. float section
 2. float arm section
 3. upper arm section
 4. indicating segment
 5. pivot pin axle
 10. edge of indicating segment FIG. 3 is an end plan view of the indicating segment and arm sections of FIG. 2 where:
 2. float arm section (partial)
 3. upper arm section
 4. indicating segment
 5-5' pivot pin axle FIG. 4 is an enlarged side elevation view of the components of the liquid level indicating gage where:
A. Angle between float arm section and upper arm section.
 1. float section
 2. float arm section
 3. upper arm section
 4. indicating segment
 5. pivot pin axle
 6. leg mount
 7. sight window
 8. axle mount hole
 9. mounting screws
 10. edge of indicating segment
 11. arc of sight window
 12. tank bottom
 13. tank top
 14. screw mounting holes
 15. tank
 16. clearance between arcs 4 of 11, and indicating segment 4

Figure 5:
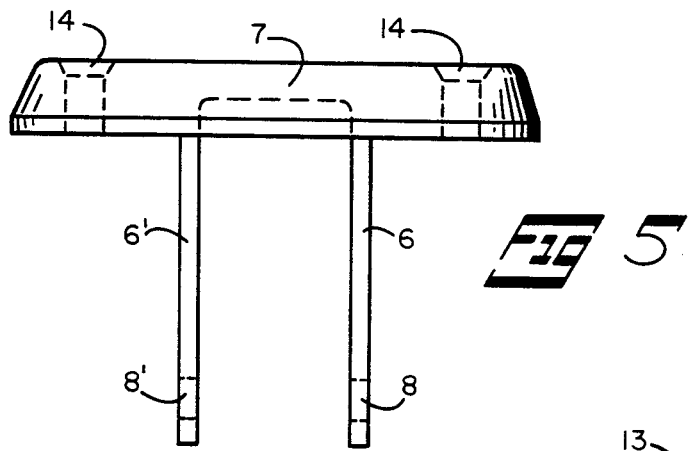
Figure 6:
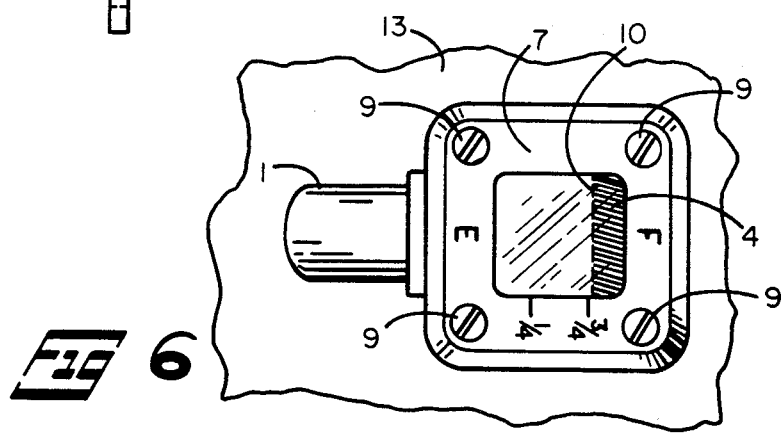

FIG. 5 end elevation view of sight glass where:
 6-6' leg mounts
 7. sight window
 8-8' axle mount holes
 14. screw mounting holes FIG. 6, plan view of sight glass mounted on tank top where:
 1. float section
 4. indicating segment
 7. sight window
 9. mounting screws
 10. edge of indicating segment
 13. tank top

DETAILED DESCRIPTION OF INVENTION

The indicating systems for quantity of liquid in a fuel tank, comprising gages, have been assembled of many components, usually comprising a float, float arm and a freely rotatable spindle and dial to indicate amount of liquid in the tank in which the gage is mounted.

This invention discloses a simple tank gage, that is easily assembled of only two integral, unitary moldings of plastic. This is in contrast to the assembly of gages comprising a cork assembled on a lever arm and said arm mounted on an axle, in turn assembled with other components, which adds considerably to costs due to assembly time and difficulties.

This present invention discloses a liquid level gage comprised of only two major components which are sight window 7 and leg mounts 6, 6' thereon molded as an integral or unitary structure of clear plastic such as for example clear nylon. The other major component is a plastic molded unitary, integral structure comprised of fixed arms 2, 3 and indicating segment 4, float 1 extends from float arm section 2. This molding as a unitary or integral structure is of foamed plastic such as for example foamed nylon. This molding to have a specific gravity less than the liquid being measured. For example, gasoline has a specific gravity of about 0.7, thus the float section 1 must have a specific gravity of less than about 0.7, for the float 1 to actuate the indicating segment 4, in sight window 7 to indicate liquid level in tank 15.

This present invention of a liquid level indicating gage molded of plastic can be described further as two fixed arms 2 and 3 consisting of upper arm section 3, float arm section consisting of an arm section 2, and a float section 1, attached thereto, said float 1 extending from the end of said float arm section 2, an upper arm section 3 and indicating segment 4 extending from upper arm section 3, said arms 2 and 3 mounted at an angle of 90° from each other, a sight window 7 having an arc 11 therein leg mounts 6, 6' extending from sight window 7, said indicating segment 4 being an arc segment, concentric to arc 11 of sight window 7 and clearance between said concentric arcs 4 and 11, fixed arms pivot pin axle 5, 5' mounted in holes 8, 8' of said leg mounts 6, 6' and the above described liquid level indicating gage to be mounted in tank top surface, with sight window attached to tank top 13 and the above described component assembly immersed in the tank 15, as shown in FIG. 4.

The indicating gage of this invention consists of a float section 1, float arm section 2, upper arm section 3, and indicating segment 4, all of above segments as shown in FIG. 2 are molded of plastic or foamed plastic as one integral, unitary component. The above mentioned molding can be molded as one unitary structure of a foamed plastic such as foamed nylon. For use in gasoline fuel tanks, the plastic of the molding should be compatible with, meaning not affected by, gasoline or other liquid and usable in such an environment. Foamed nylon is particularly suitable for this component, thus the float section 1 is integrally molded as part of the float arm section 2, and said float extends from the end of float arm section 2.

The indicating segment 4, is molded as an integral part and extends from the end of the upper arm section 3.

Indicating segment 4, is of such width to be visible through the sight window 7 and is a bit narrower than the width of arc 11 in said sight window to allow free movement of the indicating segment 4, as actuated by the float section 1.

The integral molding of FIG. 2 comprising components float section 1, float arm section 2, upper arm section 3, and indicating segment 4 is molded of a foamed plastic material such as foamed nylon compound, and further the compound to be of a colored material such as red, white, or yellow so that indicating segment 4 can be easily noticed or "read" through the sight window 7.

Referring now to FIG. 3 showing an end plan view of the indicating segment 4 and the fixed arms of FIG. 2, hubs 5, and 5' are integrally molded and are part of the fixed arms of FIG. 2. The hubs 5' and 5 at the juncture of float arm section 2 and upper arm section 3 are the pivot points for the arm sections 2 and 3, float 1 and indicating segment 4.

Legend 2 of FIG. 3 is a partial segment shown of float arm section.

The component disclosed in FIG. 5 can be identified as the sight window 7, molded of clear transparent plastic as an integral, unitary unit with leg mounts 6 and 6' and leg mount holes 8 and 8' positioned in leg mounts 6 and 6'. The sight window 7 is molded such that there is an arc on the under side of the sight window 7. This arc for convenience can be described as being on the underside of the sight window 7, and concentric with the arc of indicating segment 4. The width of arc on the underside of sight window 7, is of such width to allow free movement of indicating segment 4.

The above mentioned arc 11 in sight window 7 is concentric with the arc of the indicating segment 4, and is shown in FIG. 4.

This liquid level gage can be made to fit and be usable in most any size tank. The major consideration is to consider the size of the sight glass and the depth of the tank in which the gage will be used.

As an example on using the above described gage in a tank about 6" deep and a sight window 7 of length, for example, of 2", the ratio of upper arm section to float arm length, including float length, would be about 1:3 to 1:15, depending on tank size and sight window size.

The angle A can vary from 90° to 120°. This is the angle between the upper arm section 3, and the float arm section 2.

The sight window 7 and leg mounts 6 and 6', which contain the mounting holes 8 and 8', can be assembled as one component, but it is preferred that this assembly be an integral unitary molding, for example, of clear nylon. In such a molding 11, arc of sightglass is formed in the molding operation.

The liquid level indicating gage of this invention is shown as assembled in FIG. 1, which is an elevation view. FIG. 4 is an enlarged elevation view wherein sight glass 7 is shown as integrally molded to include leg mounts 6 and 6', and 11, arc of sight glass. Leg mounts 6 and 6' each have a mount hole 8 and 8' for mounting pivot pin axle 5 and 5' in mount holes 8 and 8', such that arm sections 2 and 3 pivot as a unit on hubs 5 and 5' mounted in holes 8 and 8' such that indicating segment 4 is concentric to arc of sight window 11.

Sight window 7 is mounted on tank top 13 by screws 9 mounted through holes 14 of sight window and screws 9 are anchored in tank top 13. FIG. 4 is as stated above, a magnified elevation view of this gage, and as shown, float segment 1, is resting on tank bottom 12. The leading edge of indicating segment 10 indicates the status of fill of the tank 15, when sighted through sight window 7.

Sight window 7, as shown in plan view FIG. 6 may have marks thereon to indicate amount of fill in the tank 15, as indicated by 10 leading edge of indicating segment 4. This leading edge 10 of indicating segment 4 is the leading edge of indicating segment 4.

Referring now to FIG. 4, it is to be pointed out that there is a clearance 16 between arcs 4 and 11, which clearance allows free movement of the indicating segment 4, when actuated by float section 1. The free movement indicated above can further be described as the indicating segment 4 moving concentric to 11, arc of sight window, said movement being actuated by float section.

Having described my invention, I claim:

1. A liquid level indicating gage wherein the improvement comprises:
   (a) two fixed arms consisting of
   (1) upper arm section
   (2) float arm section, consisting of an arm section and a float section extending therefrom, said float extending from the end of said float arm section
   (b) said upper arm section having an indicating segment extending therefrom
   (c) said arms mounted at an angle of 90° from each other
   (d) a sight window having an arc therein
   (e) leg mounts integrally molded to said sight window
   (f) said indicating segment being an arc segment, said arc segment
   (g) concentric to arc of said sight window and
   (h) clearance between said concentric arcs
   (i) and said two fixed arms having a pivot pin axle mounted in
   (j) bearing holes of each of said leg mounts.

2. A liquid level indicating gage of claim 1, wherein said arm sections are mounted at an angle of 90° to 120° from each other.

3. A liquid level indicating gage of claim 1, wherein said sight window mounted on a tank top and the float arm section, said float arm section and the indicating segment mounted on pivot pin axle and said pivot pin axle is mounted in the bearing holes of the leg mounts attached to the sight window and total assembly immersed in the tank under the sight glass.

4. A liquid level indicating gage of claim 1, wherein said sight window is mounted on a top surface of a tank and calibration of F, ½ and E values is on said sight window.

5. A liquid level indicating gage of claim 1 wherein the float arm section length is greater than the length of the upper arm section.

6. A liquid level indicating gage of claim 1, wherein the improvement consists of an integral unitary molding of said upper arm section and said float arm section.

7. In a liquid level indicating gage of claim 6 wherein said integral unitary molding is a foamed nylon having a specific gravity of less than 0.7.

8. A liquid level gage of claim 1 wherein the improvement comprises an integral unitary molding of said sight window having the arc segment molded therein and the leg mounts attached to said sight window and mounting holes in said leg mounts, said integral molding of clear transparent plastic.

9. A liquid level gage of claim 8 wherein the improvement consists of a clear plastic integral unitary molding of said sight window said an arc segment molded therein and the leg mounts extending from said sight window.

10. In a liquid level indicating gage of claim 9 wherein said integral unitary molding is clear nylon.

11. A liquid level indicating gage of claim 1, wherein said float arm section length is three to fifteen times longer than the length of said upper arm section.

* * * * *